Dec. 8, 1959        C. M. AKER        2,916,548
TELEVISION CAMERA
Filed Feb. 28, 1956        3 Sheets-Sheet 1
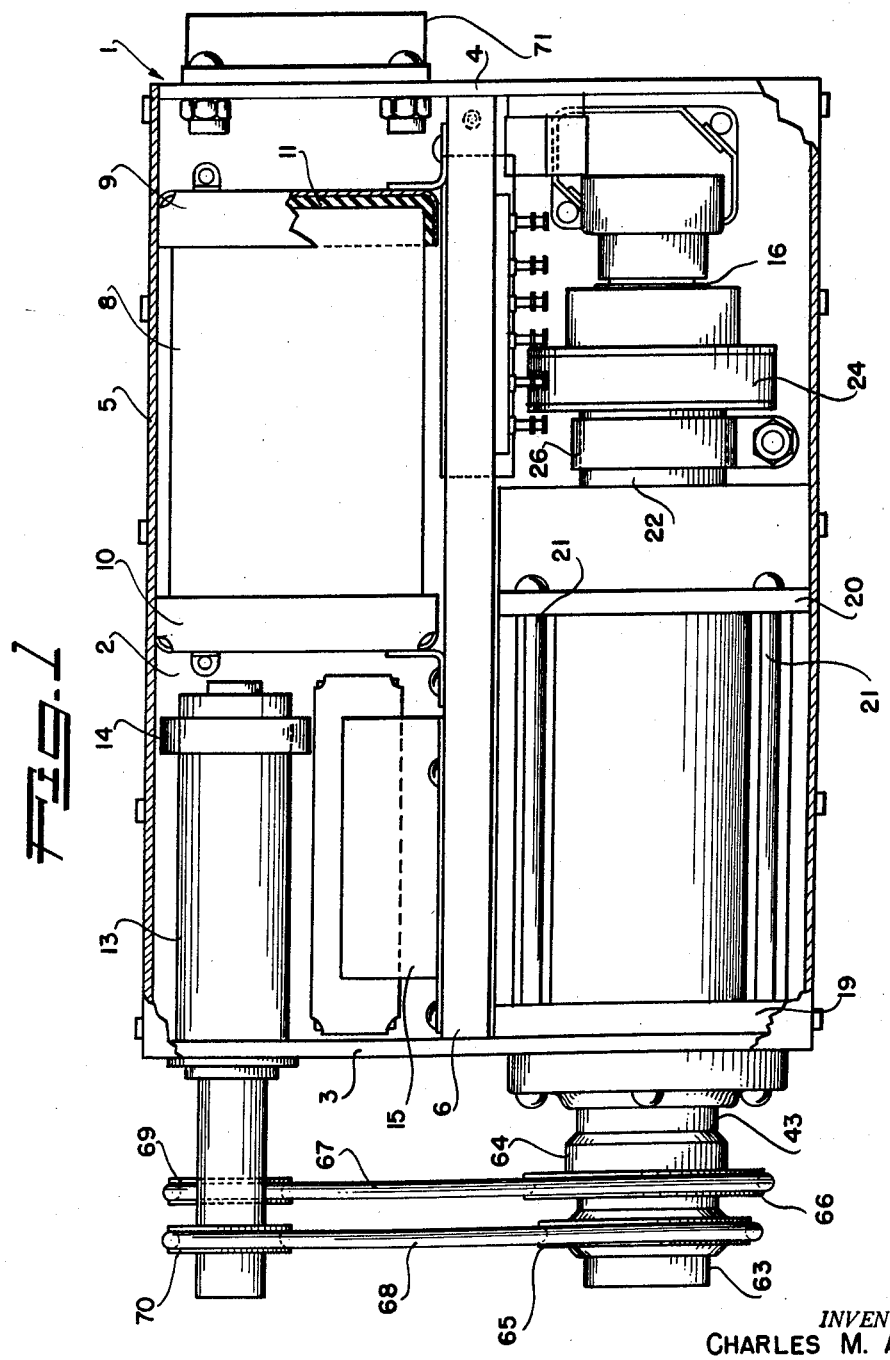
INVENTOR.
CHARLES M. AKER
BY
*George C. Sullivan*
Agent

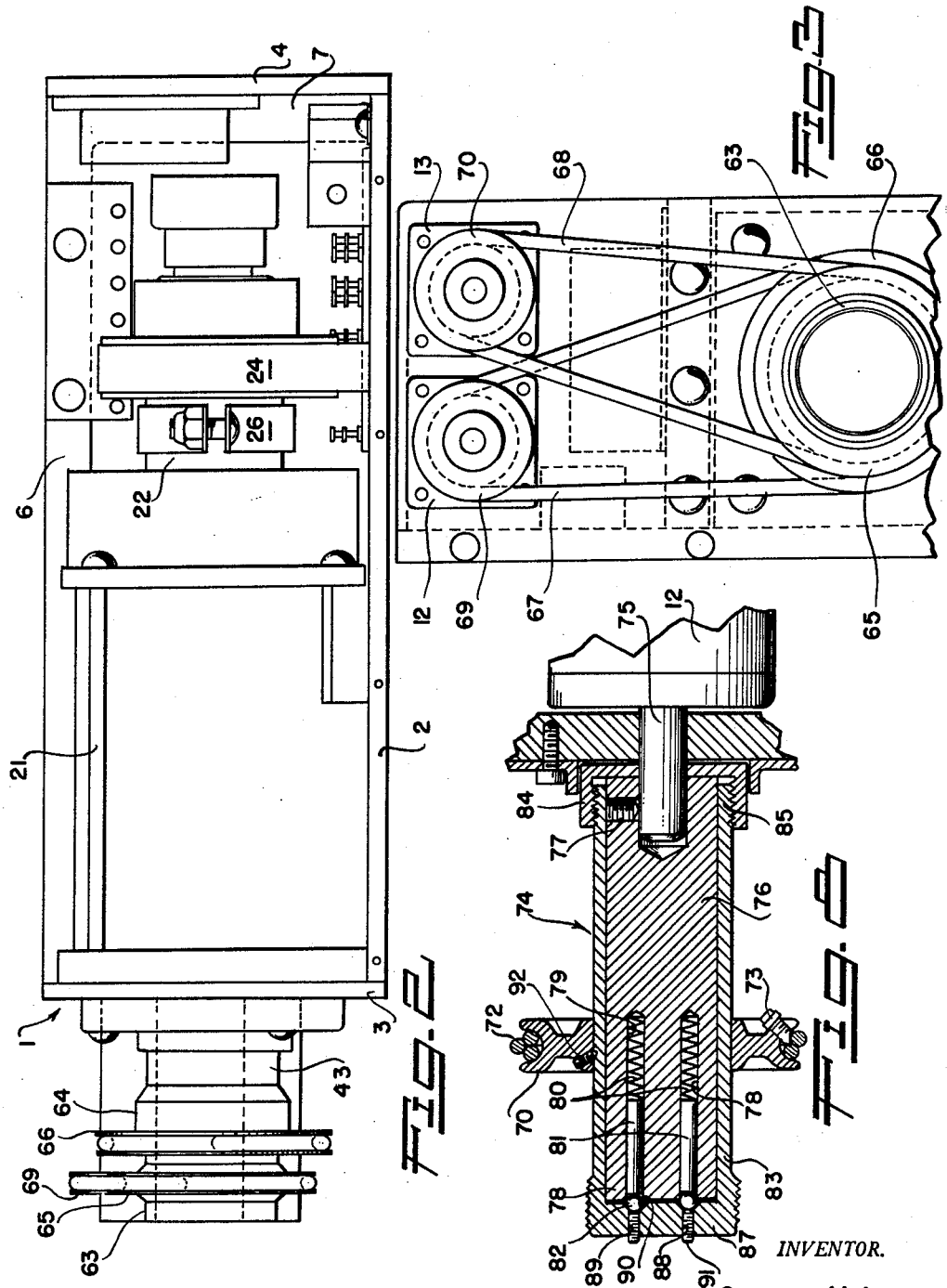

Dec. 8, 1959
C. M. AKER
2,916,548
TELEVISION CAMERA
Filed Feb. 28, 1956
3 Sheets-Sheet 3
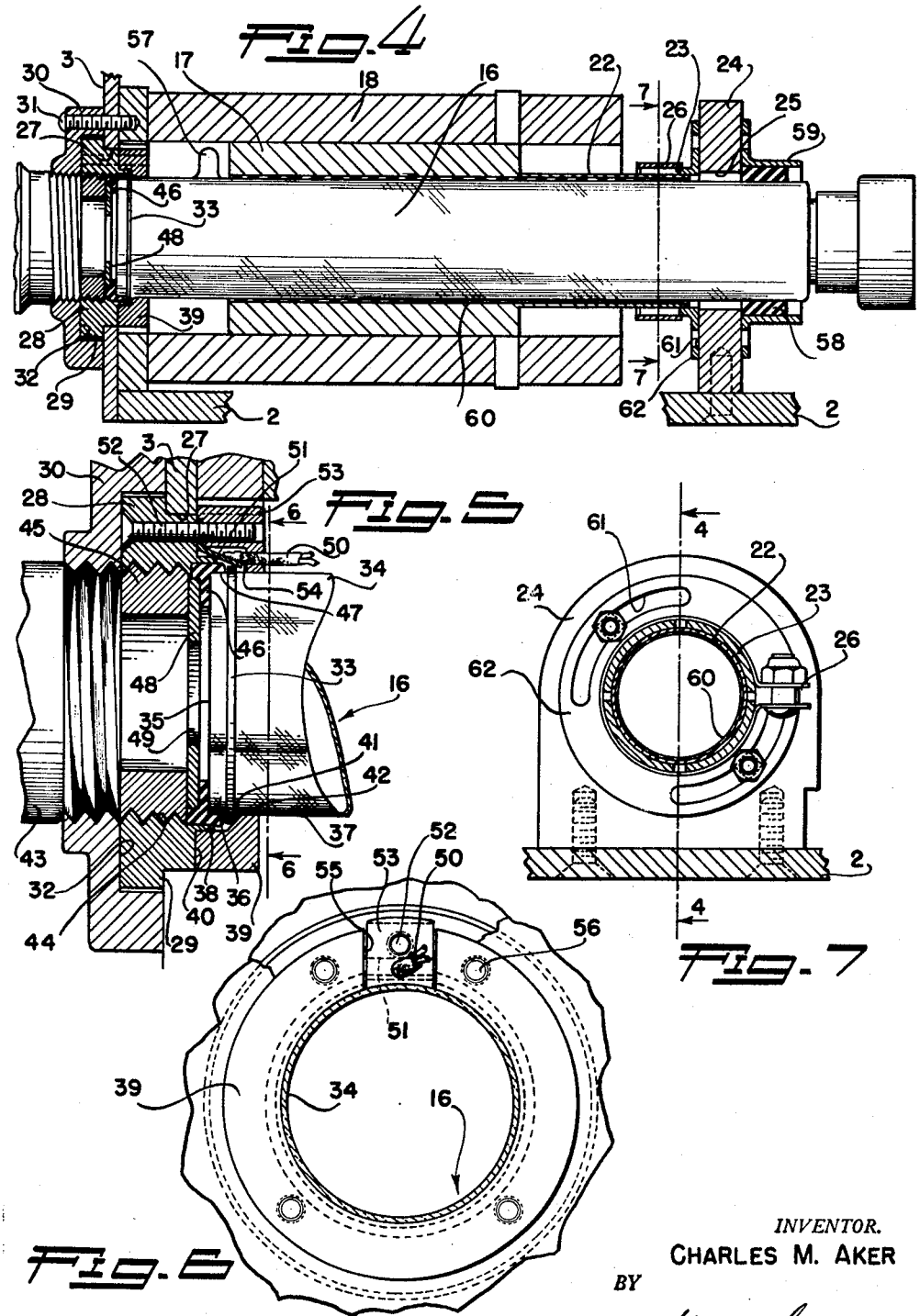
INVENTOR.
CHARLES M. AKER
BY
George C. Sullivan
Agent United States Patent Office 2,916,548
Patented Dec. 8, 1959

2,916,548

TELEVISION CAMERA

Charles M. Aker, North Hollywood, Calif., assignor to Lockheed Aircraft Corporation, Burbank, Calif.

Application February 28, 1956, Serial No. 568,250

11 Claims. (Cl. 178—7.2)

This invention relates generally to the field of television and, more particularly, to a subminiature television camera suitable for use under rugged environmental conditions such as those encountered in airborne and other industrial applications of the equipment.

One of the most important advantages to be obtained from television for industrial uses is that the equipment may be located in a space or area not safely or conveniently accessible to man for obtaining a picture which may be viewed at a remote location at the time the action under study is taking place. A typical use, for example, of industrial television, is on development studies of aircraft powerplants to observe at close range such items as the effect of the hot jet gases on the engine tail pipe. Another example is in observing the operation of landing gear on aircraft and as a visual aid device for pilots during take-off and landing operations. Still another example is in observing ground vehicle suspension and drive systems. These are only typical of the many and varied uses of television allowing more thorough and reliable developmental and operational programs to be accomplished than was heretofore possible.

In the above-mentioned uses of industrial television, it is apparent that extreme temperature and vibration conditions will often exist. The television camera must therefore either be mounted in a protective, shock absorbing case or it must be sufficiently rugged to withstand the environmental conditions to which it will otherwise be subjected. If mounted in a protective case, as has been done in the prior art, a heavy and bulky package results and what is even of more of an objection is that the camera is allowed to move with respect to its mounting and the object it is viewing. This materially decreases picture clarity at the receiver and makes it extremely difficult to obtain reliable information. The better and obviously more elegant approach to the environmental problem is to provide a camera which is itself capable of operating under the adverse conditions encountered when mounting the same directly to structure subject to vibration and the ambient temperature. By this means, relative movement between the camera and the subject being viewed may be minimized for more reliable use of the television equipment. Also the camera itself may be made much lighter in weight and smaller in size.

Accordingly, an object of this invention is to provide a subminiature television camera capable of withstanding extreme temperature and vibration environmental conditions without the use of shock mounting or shielding devices, making it ideal for airborne and other rugged industrial applications.

Another object of this invention is to provide a subminature television camera which is dependable in operation as well as both small in size and light in weight.

Another object of this invention is to provide a subminature television camera which will enable reproduction of picture detail with high resolution (in order of 550 lines) under the rugged temperature and vibration environmental conditions normally encountered in industrial uses of television cameras.

Another object of this invention is to provide a subminature television camera having a mounting arrangement for supporting the television camera pickup tube firmly in the proper position with respect to the camera lens system for maintaining the camera in proper focus even under rugged environmental conditions.

Still another object of this invention is to provide a subminiature television camera with overload safety drive means for remotely controlling the optical opening and focus adjustments under rugged environmental conditions whereby the lens mechanism may bind intermittently without damage.

Further and other objects will become apparent from a reading of the following description especially when considered in combination with the accompanying drawings wherein like numerals refer to like parts.

In the drawing:

Figure 1 is a plan view of the camera with the cover broken away to show the component arrangement;

Figure 2 is a side view of the camera with the cover removed;

Figure 3 is a fragmentary front view of the camera showing the remote control drive means for the camera lens system;

Figure 4 is a fragmentary sectional side view taken on line 4—4 of Figure 7 showing the mounting arrangement for the television camera pickup tube;

Figure 5 is an enlarged sectional side view showing the television camera pickup tube cantilever mount;

Figure 6 is a fragmentary sectional view taken on line 6—6 of Figure 5;

Figure 7 is a sectional view taken on line 7—7 of of Figure 4 showing the television camera pickup tube vibration damping bracket; and Figure 8 is a sectional side view of a safety overload mechanism forming a part of a modified form of lens head drive.

Referring to Figures 1 and 2, the camera includes a housing 1 having a base plate 2, a pair of end plates 3 and 4, and a cover 5 which is shown broken away in Figure 1. Housing 1 provides a rigid enclosure for the camera components and is an important part of obtaining satisfactory camera operation under rugged environmental conditions. Increased rigidity of housing 1 is obtained by a medially located U-shaped bridge member 6 extending lengthwise of the housing and having its legs 7 securely fastened to base plate 2.

On one side of bridge member 6 within housing 1 is carried a video amplifier 8 of conventional design which is supported by brackets 9 and 10 through a silicone rubber pushing such as that shown at 11. The silicone rubber provides a shockproof mounting for the amplifier while being a good conductor of heat, which characteristic is important to the efficient and dependable operation of the amplifier.

Also, on the one side of channel member 6 within housing 1 is carried a pair of polarity sensitive direct current motors 12 and 13, as best shown in Figures 1 and 3. Motors 12 and 13 are rigidly supported by housing 1 through end plate 3 and a bracket 14 secured to base member 2. Motors 12 and 13 may be remotely controlled for operating the lens opening and focus adjustment mehcanism as hereinafter described.

A resistor panel 15 is secured to bridge member 6 for use in the camera control circuitry. The resistor panel is potted in epoxy resin to prevent relative movement of the components mounted thereon.

A photosensitive, photo-conductor type television camera pickup tube 16 such as a "Vidicon" tube manufactured by the Radio Corporation of America, together with its associated deflection and focusing coils 17 and 18 respectively, are carried within housing 1 on the opposite side of bridge member 6, as best shown in Figures 1 and 4. The tube deflection and focusing coils are supported independently of the tube itself by confining the same between bulkheads 19 and 20 suitably secured to housing 1 and to each other by means of bolts 21 which form a cage-like structure around the coils. As shown in Figure 4, a sleeve 22, forming a part of and extending aft from the deflection coil 17 slidably engages a split sleeve 23 which is secured to bracket 24 mounted on base plate 2. Bracket 24 is made of a high strength material such as an aluminum alloy. As shown in the drawing, bracket 24 is provided with an opening 25 concentric with sleeve 23 which is somewhat larger than the outside diameter of tube 16. A C clamp 26, or the like, is employed in conjunction with sleeve 23 for firmly clamping sleeve 22 on the deflection coil assembly. As shown in Figure 7, cam-like notches 61 are formed in the attaching flange 62 for sleeve 23 whereby the tube deflection coil may be rotated by rotating sleeve 23.

The mounting for photosensitive television camera pickup tube 16 is best shown in Figures 4 and 5 wherein an opening 27 is formed in the front end plate 3 of housing 1 concentric with tube deflection and focusing coils 17 and 18. An annular collar 28, having a flange 29 formed on the outer wall thereof is slidably received within opening 27 so that flange 29 rests against front end plate 3 when assembled. Collar 28 is restrained with respect to the camera housing and the tube deflection and focusing coils 17 and 18 by a lens mount bracket 30 suitably secured to end plate 3 by means of bolts 31, or the like. Lens mount bracket 30 is provided with a recess 32 to accommodate collar 28 with its flange 29 and firmly hold the latter against relative movement in either an axial or radial direction with respect to the lens head 43.

Any standard motion picture camera lens head such as the Bausch and Lomb Optical Company's 25 mm. f/1.5 lens assembly is satisfactory for use on the camera described herein.

Photosensitive tube 16 is provided with a signal pickup flange 33 which projects radially outwardly from the glass envelope 34 of the tube adjacent the face 35 thereof. The front portion 36 of the glass envelope 34 of tube 16 is fused to signal pickup flange 33 which is, in turn, fused to the aft portion 37 of the tube. Front portion 36 of tube 16 projects into a tubular extension 38 on collar 28. An annular holddown ring 39 is adapted to slide over the aft portion of tube 16 and seat firmly against a mating surface 40 on collar 28 in telescopic engagement with tubular extension 38. The hold-down ring 39 is secured to collar 28 by suitable means such as screws 56 as best shown in Figure 6. A tapered, inwardly directed flange 41, formed on the inner wall 42 of ring 39, engages signal pickup flange 33 of tube 16 to hold the tube the proper axial distance from lens head 43 so long as tube flange 33 is in engagement with the tapered flange 41 on ring 39.

The inner wall 44 of collar 28 is threaded to receive an annular retaining ring 45. Interposed between retainer ring 45 and face 35 of tube 16 is a resilient washer 46 which engages the outer edge of face 35 and wraps therearound to engage the side wall 47 of the front portion of the tube where it is confined between the tube envelope and extension 38 on collar 28. Washer 46 should be a material which is relatively insensitive to temperature variations such as silicone rubber and have a Shore durometer hardness in the neighborhood of 15 to 30. A stiff backup washer 48 is inserted between retainer ring 45 and resilient washer 46 to permit screwing retainer ring 45 in and out without damaging the resilient washer. Backup washer 48 is provided with an opening 49 to also serve as a face mask for tube 16 to block any stray light which might pass through the lens system outside of the desired picture area.

The tube is supported relative to lens head 43 in cantilever fashion by simply screwing retainer ring 45 inwardly to compress resilient washer 46 and apply a load on the outer edge of face 35 of the tube which forces flange 33 firmly against the tapered flange 41 on ring 39. By applying the supporting force continuously around the outer edge of the face of the tube, a large total holding force may be obtained to prevent relative movement of the tube with respect to the lens head under the most rugged environmental conditions anticipated. At the same time a relatively small load in pounds per square inch is imposed on the face of the tube because of the relatively large area involved. The resilient washer 46 not only effectively distributes the load on the outer edge of face 35 to hold the tube against axial movement due to vibration, but it also applies a radial force to the side 47 of the tube by virtue of being confined between extension 38 on collar 28 and the tube itself to resist any movement in a lateral direction. The force exerted by resilient washer 46 restraining the tube against lateral movement works as a couple in cooperation with the restraint imposed upon such movement by the use of tapered flange 41. Thus the camera pickup tube is held firmly in position with respect to lens head 43 in a cantilever fashion by applying both an axial and radial compression load on a short section of the tube.

The output signal from tube 16 is obtained by soldering or otherwise suitably securing a lead 50 to a spring type contact element 51 which is spring urged into engagement with tube flange 33. Contact element 51 is supported at one end by holding the same firmly against seating surface 40 on collar 28 by means of a screw 52 and a retaining nut 53. The shape of contact element 51 is such that it is urged into engagement with flange 33 on the tube by its own spring action. The force exerted by the contact element is preferably sufficient to prevent movement of the same away from flange 33 under all anticipated vibration and shock loads, however, wire lead 50, when inserted through opening 54 in retainer nut 53, also urges the contact element into engagement with the signal pickup flange on the tube in a manner similar to that which would be accomplished by a set screw inserted through the same opening in lieu of lead 50. Since contact element 51 is fixed in position with respect to collar 28 there is no relative movement between the contact element and flange 33 on the tube. This is very important in eliminating microphonic noise under extreme vibration environmental conditions and hence is a noteworthy feature of the tube mounting arrangement.

As noted in Figure 6, retainer nut 53 which holds contact element 51 seated against collar 28, is inserted in a slot 55 formed in hold-down ring 39. This slot in hold-down ring 39 is purposely made as wide as necessary to permit sliding the hold-down ring past projection 57 formed on the outer surface of the camera pickup tube so that the tube mount and tube may easily be assembled and disassembled.

Collar 28 and hold-down ring 39, and preferably also retainer ring 45 and retainer nut 53, as well as screws 52 and 56 which hold the mounting assembly together are of a reasonably high strength material having good electrical insulating properties. Nylon is preferred in this application because of its high impact strength as well as its low dielectric constant (approximately 3 at a frequency of 1 megacycle) which will allow the same to act like a very small capacitor to ground thereby avoiding any leak-off of the signal from the photosensitive tube through the camera housing.

Since the photosensitive camera pickup tube 16 is supported at its front end in cantilever fashion, it is subject to limited bending or whipping action under extreme shock and vibration load conditions. Therefore, to avoid the possibility of breaking the glass tube envelope and also to aid in maintaining the tube in the proper angular alignment with respect to the lens system, a resilient bushing 58 of silicone rubber, or the like, is employed at the base end of the tube, as shown in Figure 4, which is carried on bracket 24. As an additional precaution against tube breakage, deflection coil 17 is separated from the glass envelope of the tube by a thin resilient sleeve 60 of resilient material such as silicone rubber.

Since the camera is intended to operate remotely and under lighting conditions which may vary considerably, it is desirable to employ remote control means for the lens system iris and focus adjustments as represented by sleeves 63 and 64 respectively on lens head 43. This is accomplished, as shown in Figures 1, 2 and 3, by mounting pulleys 65 and 66 on the iris and focus sleeves 63 and 64 and driving the pulleys by motors 12 and 13 through elastic belts 67 and 68. These belts engage pulleys 69 and 70 attached to the output shafts of motors 12 and 13. Motors 12 and 13 are of a direct current polarity sensitive type so that sleeves 63 and 64 may be rotated in either direction. The elasticity in the belts allow sufficient relative movement between the drive and driven pulleys to permit the iris and focus adjustment sleeves 63 and 64 to stop rotating for short intervals of time when they bind due to the peak acceleration loads under vibration conditions to thereby avoid damaging the lens head.

A modification adapted to replace the elastic belt drive to the lens head is shown in Figure 8, for use where the constant tension load of the elastic belt is undesirable. In this modified configuration, a substantially inelastic cable 72 is wound several times around both the drive and driven pulley such as pulleys 70 and 65 respectively and anchored at each pulley by suitable means such as set screws 73 to prevent slippage while allowing adequate rotational movement for adjusting the lens head iris and focus controls. A clutch type overload safety device to prevent damaging the lens head is incorporated into the extension 74 on shaft 75 of each motor 12 and 13. Extension 74 includes a shaft extension cylinder 76 which is secured to motor shaft 75 by means such as set screw 77. The free end 78 of cylinder 76 is provided with a pair of tapped holes 78 and 79 wherein each contain a spring 80, a piston 81 and a ball bearing 82. A sleeve 83 telescopically engages cylinder 76 and is held in a fixed axial position with respect to the cylinder by a retainer cap 84 which threadedly engages the inner end 85 of the sleeve. An end bulkhead 87 is formed on sleeve 83 closely adjacent end 78 of cylinder 76 to contain ball bearings 82. A pair of tapped holes 88 and 89 are formed in bulkhead 87 to mate with holes 78 and 79 in cylinder 76 in at least one rotational position of sleeve 83 relative to cylinder 76. The diameter of holes 88 and 89 is less than the diameter of ball bearings 82, however the holes are beveled to provide a cone-shaped recess 90 for receiving the bearings and transmitting torque from cylinder 76 to sleeve 83. The amount of torque transmitted of course will depend upon the size and shape of the recesses as well as upon the force exerted by springs 80. To modify the shape of the recesses for regulating the amount of torque transmitted, a set screw 91 is inserted in each tapped hole 88 and 89. By running the set screws in to decrease the depth the ball bearings 82 may enter the recesses, the transmitting torque will be lowered and by running the set screws out, the transmitting torque may be increased. Thus, even though the drive and driven pulleys are restrained against relative rotation by cables 72, damage to the lens head due to the application of excessive torque is avoided.

In the configuration of Figure 8 the drive pulleys are fixedly secured to sleeves 83 by means of set screws 92 or the like in the same manner that the pulleys are secured to the motor shaft extension in the resilient belt configuration illustrated by Figures 1, 2 and 3.

A desirable feature of the clutch type drive configuration of Figure 8 is that manual overriding of the clutch may be effected to adjust the lens head iris and focus controls when desired by simply rotating sleeve 83 by hand whereas with the resilient belt arrangement, manual adjustment of these controls can be accomplished only by removing the belts.

The camera control voltages for driving the photosensitive pickup tube are applied to the camera from an external source through a terminal box 71 secured to rear end plate 4 as shown in Figure 1. The output signal from the camera, also obtained at terminal box 71, is employed to drive a television receiver through a direct cable connection or through a radio link or both in the conventional manner. Since the circuitry itself, as distinguished from the mechanical arrangement of components, form no part of this invention, it is omitted from the drawings.

In use, the camera is mounted so that the lens system as represented by lens head 43 is aimed toward the subject to be viewed. The control voltages for driving the photosensitive television camera pickup tube are applied to the camera through terminal box 71 and a signal representing the image of the object viewed through the lens system is extracted from the camera pickup tube through lead 50. This output is amplified in video amplifier 8 and fed to a television receiver remotely located from the camera to provide a picture of the object image formed by the lens system and picked up in the photosensitive television camera pickup tube. Because the pickup tube is effectively restrained from relative movement with respect to the camera lens head and because of the over-all packaging arrangement, a high quality picture may be produced at the receiver even under extreme vibration and temperature conditions.

To adjust the iris and focus controls in the lens head, voltages of the proper polarity are applied remotely to drive motors 12 or 13 or both. In the configuration of Figures 1, 2 and 3, the resilient belts prevent damaging the lens head components by allowing limited relative movement between the drive and driven pulleys when the peak acceleration loads cause the lens head mechanism to bind. This use of the resilient belts produces non-uniform rotational speed of the iris and focus control sleeves in the lens head when operated during the application of shock loading but this has no undesirable effect on the ability of the camera to produce a clear picture. This is true of any of the conventional lens heads such as the one mentioned hereinabove as being suitable for use with the camera of this invention. In the configuration of Figure 8, there is no relative rotational movement between the drive and driven pulleys, but the maximum torque load is limited by the ball bearing clutch to prevent damaging the lens head. When the lens head binds during operation of either drive motor 12 or 13, ball bearings 82 associated with the particular drive system are forced out of engagement with the recesses in bulkhead 87 to allow sleeve 83 to stop rotating even through the drive motor continues to operate.

While a specific television camera configuration has been shown herein in connection with the tube mount it is for purposes of illustration rather than limitation. Accordingly, it is to be understood that certain alterations, modifications and substitutions may be made to the instant disclosure without departing from the spirit and scope of the invention as defined by the appended claims.

I claim:

1. A television camera comprising, a frame, a lens head secured to the frame, a collar secured to the frame and generally coaxially aligned with the optical axis of the lens head, a photosensitive television camera pickup tube having one end thereof projecting into said collar, said tube having a radially outwardly extending flange secured thereto adjacent said one end, a hold-down ring secured to said collar concentric with said tube and arranged to seat against the outer edge of said flange and confine the same between the collar and ring, a resilient washer interposed between said collar and said one end of the tube and exerting a compressive force thereon between the one end and said flange sufficient to maintain the latter seated against the hold-down ring under all anticipated vibration loads, said ring having a tapered flange engaging seat for exerting lateral as well as axial control forces restraining tube movement, and a shock damping support carried by the frame and engaging the tube adjacent the opposite end thereof for minimizing the bending loads in the tube itself.

2. A television camera comprising, a frame, a lens head secured to the frame, a collar secured to the frame and generally coaxially aligned with the lens, a photosensitive television camera pickup tube having one end thereof projecting into said collar, said tube having a radially outwardly extending flange secured thereto, a hold-down ring secured to said collar concentric with said tube and arranged to seat against said flange and confine the same between said collar and ring, and a resilient washer interposed between said collar and said one end of the tube and exerting a compressive force on the tube between the one end and said flange sufficient to maintain the latter seated against the ring under maximum anticipated vibration loads whereby a subsantially fixed distance may be maintained between the lens head and tube even under rugged environmental conditions.

3. In a television camera having a frame, an optical viewing lens head, and a photosensitive pickup tube adapted to transform images produced by the lens head into electrical signals, a tube mount for maintaining the proper relative position of said tube with respect to the lens head comprising, a collar generally coaxially aligned with the lens and rigidly secured to said frame, a clamping ring removably secured to said collar, an outwardly projecting radial flange secured to the tube adjacent one end thereof and interposed between said collar and ring, a resilient washer interposed between said collar and the one end of said tube and urging said flange against said ring with a force sufficient to maintain contact therewith under maximum anticipated acceleration loads, and a shock damping support carried by the frame and engaging the tube adjacent the opposite end thereof for suppressing tube vibrations and maintaining the same in a generally coaxially aligned position with respect to the lens head.

4. A television camera comprising, a frame, lens means rigidly carried by said frame, a collar secured to said frame adjacent said lens means and arranged in a generally coaxial relationship with the lens means, a hold-down ring secured to said collar, a television camera pickup tube, said tube having an outwardly projecting signal pickup flange formed thereon adjacent one end, said flange being interposed between said collar and ring for fixing the tube location relative to said lens means, a resilient washer interposed between the outer peripheral portion of said one end of the tube and said collar for damping vibrations in a direction axially of the tube and maintaining a predetermined space relationship between the tube and lens means, a resilient bushing carried by said frame and engaging the free end of said tube for stabilizing the same against shock loads in a direction normal to the tube longitudinal axis, and signal pickup means carried by said collar and engaging the flange on said tube for obtaining an output from said camera representing the image formed by said lens means.

5. A television camera comprising, a housing, optical lens means secured to said housing, said housing having an opening formed therein and aligned with said lens means for viewing through the housing, a photosensitive television camera pickup tube carried within said housing, said tube having a radially projecting signal pickup flange adjacent one end thereof, a ring engaging said pickup flange, collar means carried by said housing and concentric with said opening and supporting said ring, and a resilient washer interposed between the ring and collar means and engaging the end of the tube and exerting a compressive force thereon between the ring and washer to suppress tube movement relative to said ring, said collar means being connected directly to said housing and lens means whereby the distance between the tube and lens means is fixed.

6. A television camera comprising, a housing, said housing having an opening formed therein, a lens head fixedly carried by the housing concentric with said opening, a collar secured to said housing concentric with said opening and lens head, a television camera pickup tube having one end thereof projecting into said collar, a flange formed integral with said tube adjacent said one end, a hold-down ring carried by said collar and engaging said flange to provide support for said tube by confining said flange between said collar and ring, a resilient washer interposed between said collar and flange and exerting a compressive force on the tube whereby the same is restrained from movement relative to the lens head under a vibration environment, and drive means for said tube and lens head providing a camera video output signal representing a picture of the objects within the camera field of view.

7. A miniaturized television camera for remote control use under rugged environmental conditions comprising, a housing, said housing including a generally flat base plate, an end plate secured to said base plate, a bridge member secured to said base plate and said end plate for bracing the latter and providing a rigid mounting platform, said end plate having an opening formed therein, a lens head secured to one side of said end plate and generally coaxially aligned with said opening, collar means secured to said one side of said end plate and projecting into said opening, a photosensitive television camera pickup tube having one end thereof abutting said collar means, a hold-down ring concentrically arranged relative to said tube and fixedly secured relative to said collar means and urging said tube into forced engagement with the collar means whereby said tube is restrained from moving axially relative to said lens head under all anticipated vibration loads, said lens head having a focus control sleeve forming a part thereof for adjusting the lens head by sleeve rotation to form a clear image at a predetermined location relative to said tube, motor drive means carried by said housing, coupling means connecting said motor drive means and sleeve for effecting rotation of the latter upon actuation of the motor drive means, said coupling means being provided with an overload device allowing relative rotation between said sleeve and motor drive means in response to excessive torque loads on said sleeve whereby to avoid damaging the lens head under peak vibration loads, and conductor means carried by said collar means and insulated from said housing and engaging said tube for obtaining the camera video output signal representing the image formed by said lens head.

8. A television camera for remote control use under rugged environmental conditions comprising, a housing, said housing including a generally flat base plate, an end plate secured to said base plate, a bridge member secured to said base plate and said end plate for bracing the latter and providing a rigid mounting platform, said end plate having an opening formed therein adjacent said bridge member, a lens head secured to one side of said end plate and generally coaxially aligned with said opening, collar means abutting said end plate concentric with said opening, a photosensitive television camera pickup tube having one end thereof abutting said collar means, a hold-down ring carried by said housing and concentrically arranged relative to said tube and urging the latter into positive engagement with the collar means by compressive action whereby said tube is restrained from moving relative to said lens head under all anticipated vibration loads, said lens head having a rotatable sleeve forming a part thereof for adjusting the lens head and forming a clear image of objects in the camera field of view at a predetermined location relative to said tube, a drive motor carried by said housing, said drive motor having shaft means, said shaft means having a spring loaded retractable ball detent carried therein, a sleeve slidably received by said shaft, the last mentioned sleeve having a recess formed therein for receiving said ball detent in at least one rotational position of the last mentioned sleeve relative to said shaft whereby a limited torque load may be transmitted to said last mentioned sleeve with said last mentioned sleeve for effecting rotation of the first mentioned sleeve upon actuation of said drive motor so long as the force required to effect rotation is less than the force required to disengage the last mentioned sleeve from the retractable ball detent carried in the drive motor shaft.

9. In a television camera for remote control use under rugged environmental conditions having a lens head with a rotatable sleeve for adjusting the lens head to form a clear image, sleeve drive means comprising, a reversible motor carried by the camera, said motor having an output shaft, a spring loaded, retractable ball type detent carried by said shaft, a sleeve telescopically arranged relative to said shaft, the last mentioned sleeve having a recess formed therein for receiving said spring loaded ball type detent and transmitting rotational forces from said shaft to said last mentioned sleeve so long as the resistance to rotation exerted by the last mentioned sleeve is less than that which will produce a force sufficient to retract said detent out of engagement with said recess, and coupling means connecting said first mentioned sleeve with said last mentioned sleeve for effecting rotation of the former upon actuation of the drive motor.

10. A television camera for operation under rugged environmental conditions comprising, a rigid housing, said housing having an opening formed therein, a lens head carried by said housing concentric with said opening, collar means carried by said housing concentric with said opening and fixedly secured in position relative to said lens head, a photosensitive television camera pickup tube abutting said collar, a hold-down ring concentrically arranged relative to said tube and fixedly secured to said collar, said ring urging said tube into positive engagement with the collar whereby the tube is restrained from moving relative to said lens head under all anticipated vibration loads, and conductor means carried by said collar means and electrically isolated from the camera housing and engaging said tube for obtaining the camera video output signal representing the image formed by said lens head.

11. A television camera for use under rugged environmental conditions comprising, a rigid housing, said housing having an opening formed therein, a lens head carried by said housing concentric with said opening, a collar secured between the housing and said lens head, said collar extending into said opening, a retaining nut engaging the inner wall of said collar, a photosensitive television camera pickup tube having one end thereof projecting into said collar and adapted to receive an optical image, said tube having a radially outwardly projecting signal pickup flange secured thereto adjacent said one end, a hold-down ring rigidly supported by said collar and concentrically arranged relative to said tube, said hold-down ring having an inwardly directed flange seat engaging the signal pickup flange and confining the same between the ring and collar, and a resilient washer interposed between said retaining nut and the one end of said tube within said collar and applying a compressive force on said tube maintaining the signal pickup flange in engagement with said hold-down ring flange seat under all anticipated vibration loads whereby said lens head and tube are substantially fixed relative to each other.

References Cited in the file of this patent

UNITED STATES PATENTS

| | | |
|---|---|---|
| 2,421,476 | Belar | June 3, 1947 |
| 2,572,729 | Jackson | Oct. 23, 1951 |
| 2,681,947 | Jackson | June 22, 1954 |
| 2,720,817 | Mills | Oct. 18, 1955 |
| 2,797,564 | Bonneau et al. | July 2, 1957 |

FOREIGN PATENTS

| | | |
|---|---|---|
| 444,074 | Great Britain | Mar. 12, 1936 |